United States Patent [19]

Podgorski

[11] 3,744,908
[45] July 10, 1973

[54] EXTERNALLY BIASED RING LASER
[75] Inventor: Theodore J. Podgorski, Maplewood, Minn.
[73] Assignee: Honeywell Inc., Minneapolis, Minn.
[22] Filed: Dec. 16, 1968
[21] Appl. No.: 784,086

[52] U.S. Cl. .......................... 356/106 RL, 331/94.5
[51] Int. Cl. ............................................. G01b 9/02
[58] Field of Search ............... 356/106 RL, 106 LR; 331/94.5

[56] References Cited
UNITED STATES PATENTS
| | | | |
|---|---|---|---|
| 3,373,650 | 3/1968 | Killpatrick | 356/106 RL |
| 3,466,121 | 9/1969 | Turner | 356/106 RL |
| 3,503,005 | 3/1970 | Mocker | 331/94.5 |

OTHER PUBLICATIONS

Macek et al., Electromagnetic Angular Rotation Sensing, Defense Documentation Center Report, AD 605818, (1964), Appendix 1, pgs. 77–82.
Christiansen, Laser Gyro Comes In Quartz, pgs. 183–188, Electronics, Vol. 39, No. 19, Sept. 19, 1966.
Rigden et al., Recent Developments In $CO_2$ Lasers, IEEE Journal of Quantum Electronics, Vol. QE2, No. 9, September 1966, pgs. 365–368.

*Primary Examiner*—Benjamin A. Borchelt
*Assistant Examiner*—S. C. Buczinski
*Attorney*—Charles J. Ungemach, Ronald T. Reiling and George W. Field

[57] ABSTRACT

Apparatus to bias a laser gyroscope in which a linear induction motor is positioned adjacent to one leg of the laser gyroscope so as to generate a moving magnetic field in the laser plasma. Such a field moves or pumps the plasma gas so as to present an apparent change in the index of refraction of the gas and an apparent change in path length to the two oppositely traveling beams.

7 Claims, 2 Drawing Figures

Patented July 10, 1973

3,744,908

INVENTOR.
THEODORE J. PODGORSKI
BY Neil B Schulte
ATTORNEY

EXTERNALLY BIASED RING LASER

BACKGROUND OF THE INVENTION

In a laser gyroscope, laser light beams are generated about a closed loop path. The two beams traveling in opposite directions are compared in frequency. if the system rotates in inertial space, the two oppositely traveling beams see apparently unequal paths, oscillate at different frequencies, and this frequency difference may be measured as an indication of the direction and amount of rotation. For small rotations, however, the two beams are inclined to resonate together and "lock-in". In the prior art many schemes have been proposed to avoid this lock-in phenomenon. Most of these schemes involve biasing the laser at an apparent rotational rate higher than the lock-in threshold rate. Apparatus to accomplish this has included, for example, oscillating the entire system, changing the plasma current, or providing complicated optical apparatus in the light path. It is highly desirable to have biasing apparatus which is not a part of the system and does not hamper the ordinary lasing or block the light beam. The present invention provides apparatus to achieve this result.

SUMMARY OF THE INVENTION

Briefly, the present invention involves positioning a linear induction motor adjacent to the laser gyroscope. A linear induction motor has the capability of moving any conducting material placed near its poles. Consequently, a linear induction motor will move a conducting fluid or a conducting gas such as found in a gas laser gyroscope. The ability of a linear induction motor to pump conducting fluids is discussed in detail in the publications linear Induction Motors by E. R. Laithwaite, proceedings of the Institution of Electrical Engineers, December, 1957 and Conduction and Induction Pumps for Liquid Metals, L. R. Blake, Proceedings of the Institution of Electrical Engineers, July, 1967. The pumping action of the linear induction motor serves to move the gas in the laser gyroscope with the direction of light for one beam and against the light for the other beam. Thus, the apparent index of refraction for the two oppositely traveling beams is different and the frequencies of the two beams are different by an amount sufficient to avoid lock-in. Consequently, it is an object of the present invention to provide an improved laser gyroscope biasing apparatus. A further object of my invention is to provide a laser gyroscope biasing apparatus that is independent from and removable from the gyroscope. Still another object of my invention is to provide a laser gyroscope biasing apparatus which is easily adjustable with respect to the amount of bias provided. Other objects and advantages will become apparent to those skilled in the art upon consideration of the following description and drawings.

DESCRIPTION OF THE PREFERRED EMBODIMENT

Figure 1:
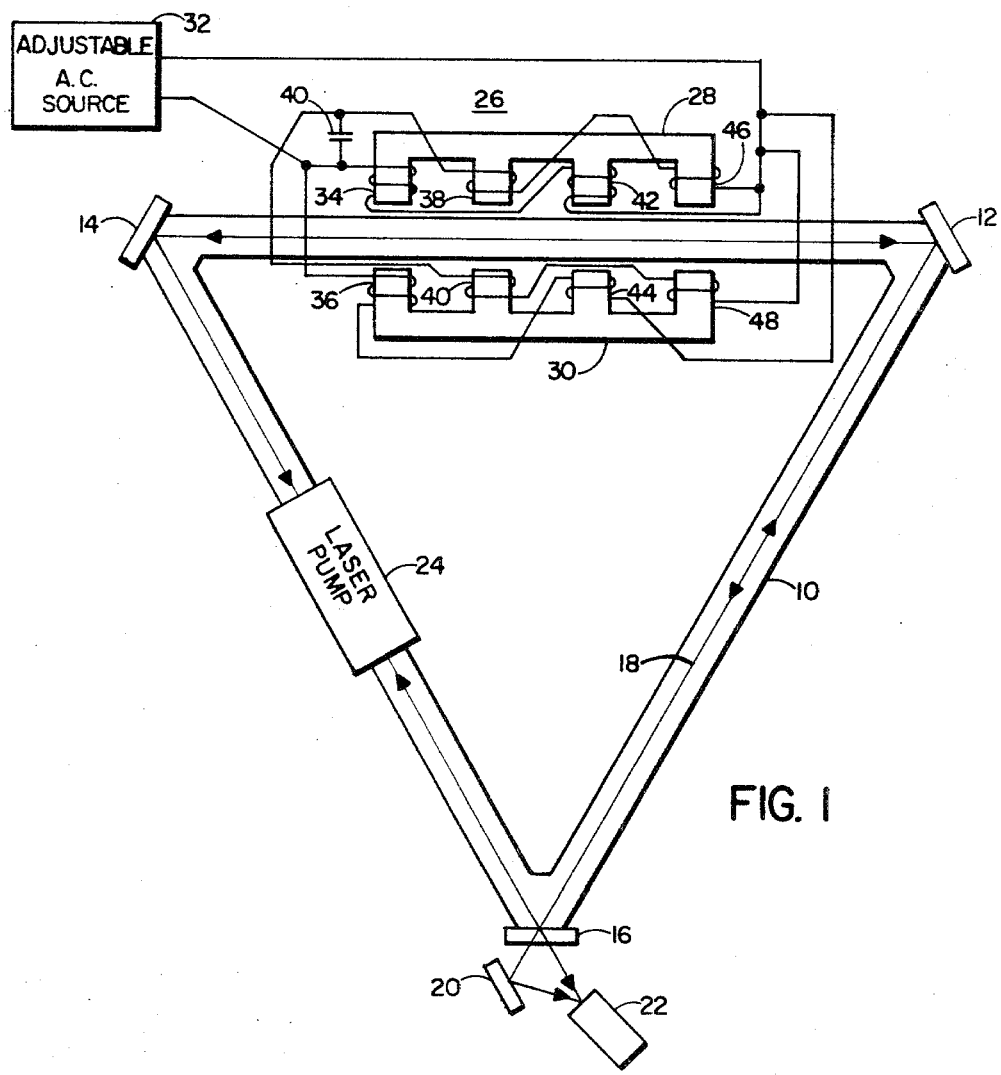
FIG. 1 is a schematic diagram showing generally the arrangement of major elements in the present invention.

In FIG. 1 a triangular gas filled tube 10 is shown constructed in accordance with principles well known to those skilled in the laser art. Mirrors 12, 14 and 16 serve to direct generated light about the triangular path. Mirror 16 is partially transparent so that the two oppositely traveling light beams 18 may pass via mirror 20 and by direct path to detector 22. Detector 22 serves to compare the frequency of the two beams and, thus, sense rotation of the entire system in accordance with principles well known to those skilled in the art. A laser pumping means 24 is schematically shown which operates to generate the laser beam by means of an electrical discharge about the triangular path. Biasing is provided by a linear induction motor shown generally by the number 26. Although only one winding core is necessary in the preferred embodiment, the more efficient arrangement untilizing two cores 28 and 30 is shown. An adjustable alternating current source 32 provides an alternating current driver signal of a desired frequency. As will be apparent from the drawing, pole pieces 34 and 36 of cores 28 and 30 have windings on them in a first direction which are in turn connected to pole pieces 42 and 44 with windings in the opposite direction. A capacitor 40 introduces a 90° lag in the signal from source 32 and presents it to pole pieces 38 and 40 in a first direction and then to pole pieces 46 and 48 in the opposite direction. Thus, it may be seen that at any given instant the magnetic field between poles 38 and 40 will be 90° behind the magnetic field at poles 34 and 36. The magnetic field at poles 42 and 44 will be 180° behind poles 34 and 36 and the magnetic field at poles 46 and 48 will be 90° plus 180° or 270° behind the magnetic field at poles 34 and 36. As source 32 generates one complete wave, a traveling magnetic field will traverse the length of linear induction motor 26 and pump the conducting gas in tube 10 so as to present a different index of refraction to the two oppositely traveling beams of light. Increasing the frequency of adjustable source 32 will increase the pumping action, and, therefore, the biasing.

Figure 2:
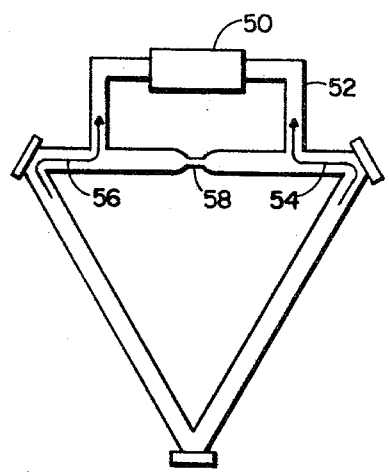
FIG. 2 is a schematic diagram showing one variation on the preferred embodiment of FIG. 1.

It is evident that various modifications may be made to the apparatus disclosed herein without departing from the spirit and scope of the invention. For example, numerous types of linear induction motors may be utilized with many variables in size, number of poles, and types of windings. It is even conceivable that the entire closed loop path of the laser could be positioned inside a circular induction motor in which a rotating magnetic field would serve to pump the gas about the closed loop path. One specific variation is shown in FIG. 2 where a linear induction motor 50 is mounted on a by-pass channel 52 so as to pump gas about the laser path in a direction shown by arrows 54 or 56. A restriction 58 cooperates with induction motor 50 to insure the proper gas flow in the system. In the embodiment shown in FIG. 2, induction motor 50 may be kept away from the direct path of the light so as not to interfere with other factors in the system. Further modifications include various types of light paths and gas containing mechanisms. In view of the above-mentioned modifications, I do not intend the present invention to be limited to the particular embodiments shown in the drawings except aS defined by the appended claims.

I claim:

1. Apparatus to bias a gas laser comprising an induction motor positioned adjacent to at least a portion of the laser path so as to cause a net flow in the ions of the gas and generate an apparent change in the refractive index of the gas.

2. Apparatus of the class described comprising in combination:
- a gas laser gyroscope;
- a linear induction motor positioned adjacent to at least a portion of the laser gyroscope so as to generate a moving magnetic field in said portion of the laser gyroscope; and
- means for supplying an alternating current signal to said linear induction motor.

3. The apparatus of claim 2 in which said alternating current supply means is a variable frequency current supply.

4. The apparatus of claim 2 in which said portion of said laser gyroscope comprises an alternate gas passageway in which laser light does not travel.

5. In combination:
- a laser gyroscope comprising a sealed endless chamber containing an energized plasma and providing a closed path for beams of light proceeding around the chamber;
- and pumping means external to said chamber for causing flow of the plasma in the chamber along the path.

6. The method of preventing lock-in in a laser gyroscope comprising an endless chamber enclosing a sealed energized plasma, which comprises causing unidirectional flow of the plasma through at least a portion of the chamber.

7. In combination:
- a ring laser comprising means for generating two beams of substantially monochromatic electromagnetic radiation which travel in opposite directions around a closed loop path in a sealed chamber containing an ionized gas, so that rotation of the laser in the direction of travel of either beam produces a frequency difference between the beams which is a measure of the rate of the rotation;
- and means external to said chamber and acting directly on the ionized gas and thereby continuously pumping it through at least a part of the path thus producing a biasing effect on the frequencies of the two beams.

* * * * *

UNITED STATES PATENT OFFICE
CERTIFICATE OF CORRECTION

Patent No. 3,744,908          Dated July 10, 1973

Inventor(s) THEODORE J. PODGORSKI

It is certified that error appears in the above-identified patent and that said Letters Patent are hereby corrected as shown below:

Claim 6, line 2, cancel "an" and substitute

--a sealed--;

same line, cancel "a" and substitute --an--;

line 3, cancel "sealed".

Signed and sealed this 6th day of August 1974.

(SEAL)
Attest;

McCOY M. GIBSON, JR.  
Attesting Officer

C. MARSHALL DANN  
Commissioner of Patents